United States Patent [19]

Wada et al.

[11] 4,409,654
[45] Oct. 11, 1983

[54] DATA PROCESSOR ADAPTED FOR INTERRUPTION TO AN INSTRUCTION STREAM

[75] Inventors: Kenichi Wada, Zama; Naoki Yamada, Hadano, both of Japan

[73] Assignee: Hitachi, Ltd., Tokyo, Japan

[21] Appl. No.: 241,370

[22] Filed: Mar. 6, 1981

[30] Foreign Application Priority Data

Mar. 7, 1980 [JP] Japan .................................. 55-28140

[51] Int. Cl.³ .............................................. G06F 9/30
[52] U.S. Cl. ................................................. 364/200
[58] Field of Search ........................ 364/200 MS File

[56] References Cited

U.S. PATENT DOCUMENTS 4,161,026 7/1979 Wilhite ............................... 364/200

Primary Examiner—Thomas M. Heckler
Attorney, Agent, or Firm—Antonelli, Terry & Wands

[57] ABSTRACT

An information processing system having an instruction unit for decoding each of successive instructions to generate an address of a next instruction, and additionally, when a branch instruction is decoded, a branch-to address of the decoded branch instruction. An execution unit sequentially executes the decoded instructions and a plurality of registers are provided for storing the next instruction address and the branch-to address. A pointer is generated to indicate one of the registers in which the next instruction address or the branch-to address is to be stored and the pointer is changed sequentially and cyclically in response to a first signal which is generated by the execution unit upon completion of execution of each decoded instruction or a second signal which is generated by the execution unit upon success in branch when a branch instruction is executed. Further provided is a delay circuit for receiving the pointer and generating it at a predetermined time delay. The delayed pointer is latched at a timing predetermined by the first and second signals and an interrupt signal produced, upon detection of an interrupt request, at a timing determined in dependence on the type of the interrupt request, and the instruction address used for a program status word is read out of one of the registers indicted by the latched pointer.

6 Claims, 10 Drawing Figures

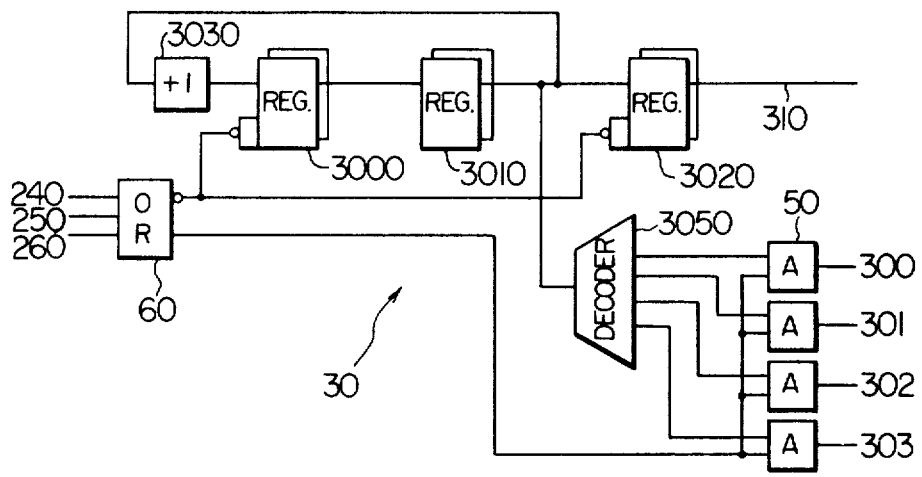
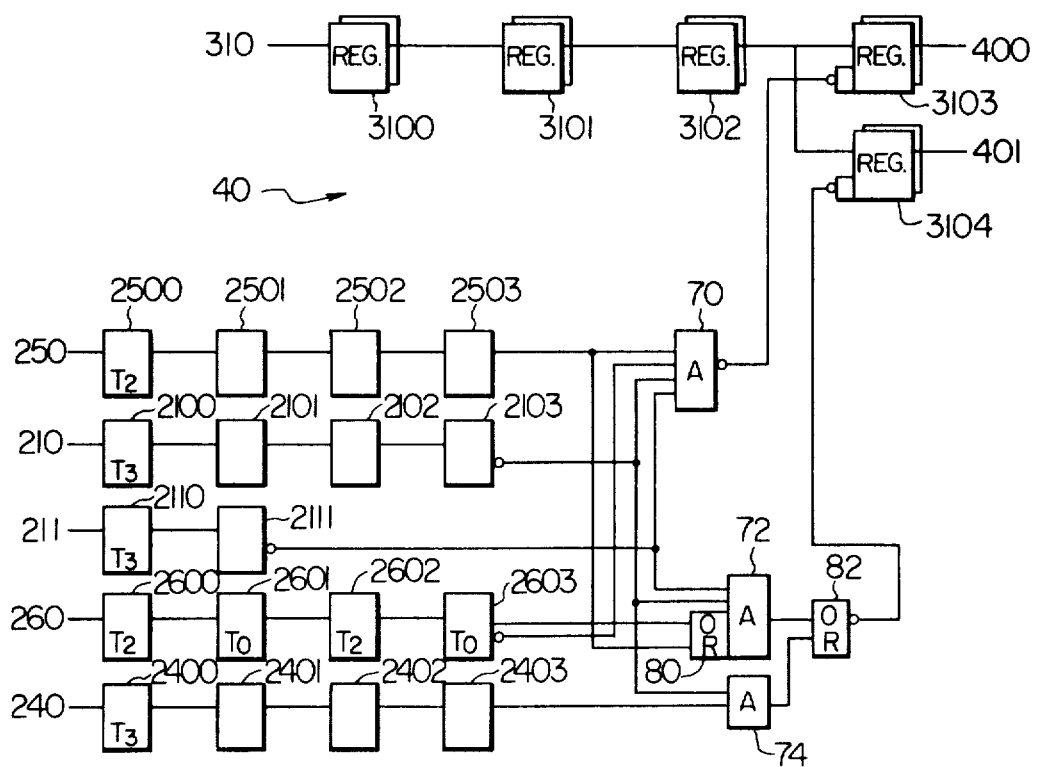

DATA PROCESSOR ADAPTED FOR INTERRUPTION TO AN INSTRUCTION STREAM

BACKGROUND OF THE INVENTION

The present invention relates to a program-controlled information processor having a simplified interruption control circuit.

When a program interruption request is issued during the execution of an instruction stream, it is necessary to interrupt the program to allow the execution of the interruption request.

The operation of the program-controlled processor is controlled by a program status word (PSW) which contains control information such as an address of an instruction to be executed next. Thus, when the interruption request is issued, the old PSW is buffered to a storage unit and a new PSW for the interruption execution program is used. After the completion of the interruption processing program, the old PSW is fetched to continue the execution of the instruction. When the interruption request is issued, the instruction address in the old PSW is modified to an address of the instruction to be executed after the completion of the interruption processing program, before the old PSW is buffered to the main storage. The instruction address of the old PSW must be determined depending on a type of interruption and the type of instruction. The type of interruption is determined depending on the process of the interrupted instruction and the instruction to be executed after the execution of the interruption processing program. Three typical examples thereof are explained below.

For a suppression type interruption, the instruction is not at all executed. For a completion type interruption, the execution of the instruction is completed. For a termination type interruption, the instruction is not executed after the interruption has occurred. That is, the suppression type interruption suppresses the initiation of the execution of the instruction, the completion type interruption suppresses the execution of the next sequential instruction and the termination type instruction carries out either one of the above processes depending on a particular machine.

When the interruption request is issued during the execution of an instruction other than a branch instruction, the instruction to be executed after the interruption processing program is the next sequential instruction of the interrupted instruction. Accordingly, the address of the next sequential instruction of the interrupted instruction has to be stored in the old PSW.

When the interruption request is issued during the execution of a branch instruction and if the interruption is of suppression type or termination type, the instruction to be executed after the interruption processing program is the next sequential instruction of the branch instruction (that is, an instruction in a branch failure stream). If the interruption is of completion type, the instruction to be executed after the interruption processing program is determined depending on whether the branch succeeds or fails as a result of the execution of the branch instruction. Thus, the instruction to be executed after the interruption processing program is the address of the next sequential instruction of the branch instruction when the interruption is of the suppression type or termination type, and when the interruption is of the completion type, it is the address of the instruction determined by the result of the branch (that is, the address of the next sequential instruction of the branch instruction when branch fails, and the branch-to instruction address when the branch succeeds). Accordingly, when the interruption request is issued during the execution of a branch instruction, the instruction address to be stored in the old PSW depends on the type of interruption and whether the branch succeeds or fails.

It should be further noted that one of the factors for the interruption is a program event recording (PER). When the program is interrupted due to the PER, a process for buffering the address of the interrupted instruction (called a PER address) to the storage unit is required in addition to the process described above. Usually, in order to determine the address of the interrupted instruction, the address of the next sequential instruction of the interrupted instruction and the instruction length of the interrupted instruction are detected. The address of the interrupted instruction is determined by subtracting the last-mentioned instruction length from the address of the next sequential instruction of the interrupted instruction to determine the address of the interrupted instruction. Accordingly, when the program interruption due to the PER is requested during the execution of the program other than a branch instruction, it is necessary to hold the address of the executed instruction for the PER address and the address to be stored in the old PSW. When the program interruption due to the PER is requested during the execution of a branch instruction, it is necessary to hold the address determined by the result of the branch (that is the address of the next sequential instruction of the branch instruction when the branch fails and the branch-to address when the branch succeeds) and the address of the next sequential instruction of the branch instruction, for the address to be stored in the old PSW and the PER address. When the program interruption due to the PER is requested after the branch has succeeded, it is necessary to hold both the branch-to address and the address of the next sequential instruction of the branch instruction. Thus, when the interruption is requested, various addresses have to be generated depending on the type of interruption and the type of interrupted instruction.

In a large-scale program-controlled information processing system, the instructions are usually executed in a plurality of stages and different stages of different instruction streams are executed in parallel. That is, the instructions are pipeline-processed.

Referring to FIG. 1, an instruction unit (I unit) 1 decodes an instruction to be executed and carries out a stage (D stage) for calculating addresses of operands necessary for the execution of the instruction. A storage control unit (S unit) 3 carries out a stage (A stage) for translating the operand addresses to addresses for accessing a main storage (MS) 4, and a stage (L stage) for fetching the operands from the main storage 4 and presenting them to an execution unit (E unit) 2. The E unit 2 carries out a stage (execution stage or E stage) for processing the instruction codes supplied from the I unit 1 and the operands supplied from the storage control unit 3, and a stage (S stage) for storing the processed results to the storage control unit 3. For each of the instructions, the stages D-S are sequentially carried out, and when each of the units completes the process of the given stage for one instruction, it immediately processes the same stage for the next sequential instruction.

In this manner, the instructions are executed in a plurality of stages and different stages of different instruction streams are carried out in parallel. When the interruption is requested during the execution of one instruction, that instruction terminates the execution of the next sequential stage of the next sequential instruction. In this case, various instruction addresses have to be generated depending on the type of interruption and the type of instruction, as discussed above.

Accordingly, when the I unit 1 decodes an instruction other than a branch instruction, it generates an address of the next sequential instruction of that instruction and holds that address until immediately before the initiation of the E stage of that instruction, when it supplies the address to the E unit 2. The E unit 2 stores the address and when the interruption request is detected during the execution of the E stage it reads out the stored instruction address during the execution of the interruption processing program to generate the address for the old PSW or the PER address.

On the other hand, when the I unit 1 decodes a branch instruction, the address of the next sequential instruction of the branch instruction (the instruction address in the branch failure stream) and the branch-to address (the instruction address in the branch success stream) are generated and held, and supplied to the E unit 2 immediately before the start of the E stage of the branch instruction. The E unit 2 stores those addresses and when the interruption request is issued, either one of those addresses is read as the address for the old PSW and the address of the next sequential instruction of the branch instruction is read as the instruction address for the PER.

Accordingly, two address lines are required to send the two instruction addresses from the I unit 1 to the E unit 2. While only the addresses have been discussed so far, not only the address of the instruction to be executed next but also the instruction length of the interrupted instruction are to be stored in the old PSW. Therefore, the two address lines as well as one instruction length code line are actually required. In a usual large-scale computer, the address comprises 24 bits and the instruction length code comprises two bits. Accordingly, total of at least 50 lines are required. Thus, the prior art system needs a number of lines connecting the I unit and the E unit and hence it is expensive. Furthermore, the prior art system has the following disadvantage.

As the operation speed of the circuit has become faster and faster in recent years, the time period occupied by one stage of each instruction, i.e., a machine cycle, has been shortened. However, as the machine cycle is more and more shortened, when the interruption request is issued in one stage of one instruction, it is impossible to terminate the execution of the next sequential stage of that instruction or the next sequential instruction of that instruction, and the instruction which should be terminated is executed. This is hereinafter called instruction overrun.

In order to resolve the above problem, the U.S. patent application Ser. No. 10,470, filed Feb. 8, 1979 which was assigned to the same assignee and corresponds to Japanese Published Unexamined Patent Application No. 54-107645 discloses a method for compensating the inconvenience due to the instruction overrun in the interruption processing program while permitting the instruction overrun. This method is hereinafter called an overrun method.

In the invention disclosed in the above-mentioned patent application, two addresses are sent from the I unit to the E unit through separate lines, and the instruction address control circuit holds those addresses in the registers in the E unit and shifts the contents of those registers to other registers as the stage proceeds. To this end, the instruction address control circuit is connected to the I unit through two address lines and it requires five registers and a circuit for controlling the data shift among those registers.

The above-mentioned patent application does not disclose the PER address generation circuit. As discussed above, in order to allow the interruption due to the PER, the instruction address control circuit has to be constructed to allow the generation of an address different from the instruction address for the old PSW when the interrupted instruction is a branch instruction and the branch has succeeded. When a plurality of registers are included and the contents thereof are to be shifted as taught in the above patent application, an additional register is required for the generation of the PER address and a complex shift control circuit therefor is required.

SUMMARY OF THE INVENTION

It is, therefore, an object of the present invention to provide an information processing system which can generate an instruction address for the old PSW and an instruction address for the PER with a simple circuit configuration.

It is another object of the present invention to provide an information processing system which can generate the instruction address for the old PSW and the instruction address for the PER based on address information supplied from the I unit through a single address line.

It is a further object of the present invention to provide an information processing system in which even if an instruction overrun takes place because of a fast (short) machine cycle when an interruption request is issued, the PER address and the address for the old PSW are supplied based on the address information supplied from the I unit via the single address line with a reduced number of instruction registers and a simple control circuit.

In order to achieve the above objects, in accordance with the present invention, the I unit comprises first means for sequentially decoding instructions and generating addresses of next sequential instructions of the decoded instructions and holding the generated addresses until the E stage for those instructions starts, second means for generating a branch-to address when the decoded instruction is a branch instruction and holding the generated branch-to address until the E stage for the branch instruction is executed and branch success or branch failure is detected, and third means for sending the address of the next sequential instruction of the instruction being executed in the E stage from the first means to the E unit before the E stage for the instruction starts and, when the branch by the branch instruction succeeds, sending the branch-to address from the second means to the E unit before the next sequential stage of the E stage for the branch instruction is executed.

The E unit in accordance with the present invention comprises an instruction address control circuit for generating the instruction addresses for the old PSW and the PER, which circuit includes a plurality of registers for storing the instruction addresses, a pointer circuit for generating a pointer for sequentially and cyclically pointing to one of those registers, means for loading the instruction address from the I unit into the register pointed to by the pointer, a delay circuit for delaying the pointer for a predetermined number of machine cycles, first and second pointer registers connected to the output terminal of the delay circuit, a control circuit for instructing set timing of the pointers of the first and second pointer registers, which control circuit is responsive to a signal indicating the start of the E stage, an interruption request signal, a signal indicating a type of interruption and a signal indicating the branch success to provide a set signal to the first pointer register at a time when the pointer to the instruction address for the old PSW is applied from the delay circuit to the first pointer register and stop to send further set signal thereafter and provide a set signal to the second pointer at a time when the pointer to the instruction address for the PER is applied from the delay circuit to the second pointer register, and means for selectively reading out the contents of the plurality of registers based on the contents of the first and second pointer registers.

BRIEF DESCRIPTION OF THE DRAWINGS

FIG. 4 shows a circuit diagram of an input control circuit used in the instruction address control circuit of FIG. 3.

FIG. 5 shows a circuit diagram of an output control circuit used in the instruction address control circuit of FIG. 3.

DESCRIPTION OF THE PREFERRED EMBODIMENTS

The present invention is applicable to the IBM System 370. Accordingly, for the definitions of the terms used, reference is made to the IBM manual entitled "IBM System 370, Principles of Operations" (GA-22-7000).

Figure 2:
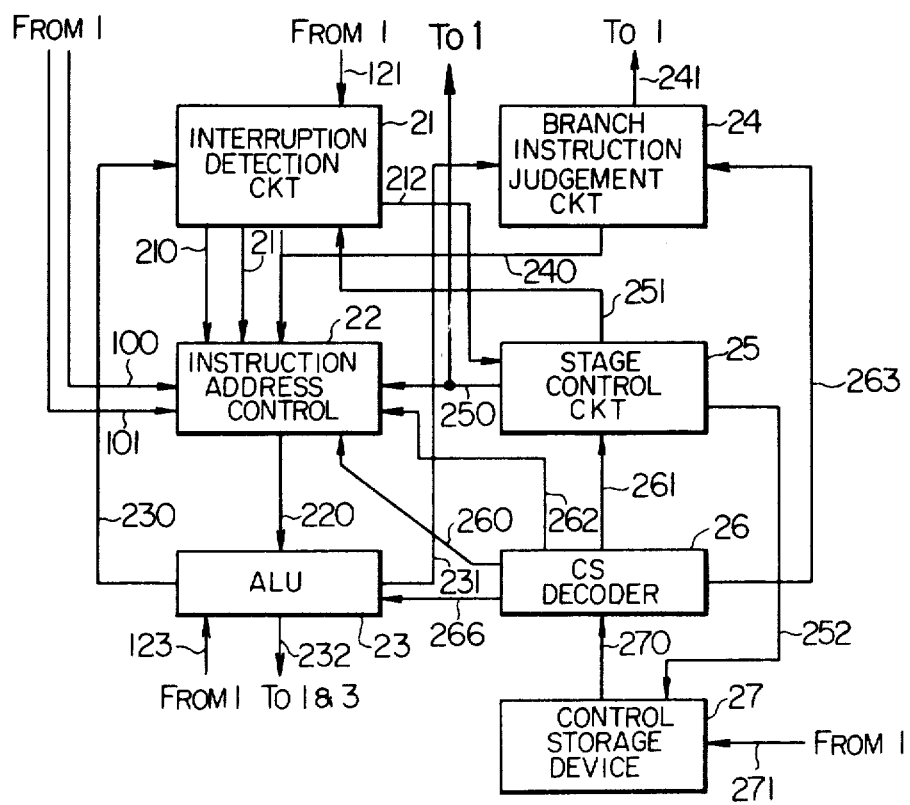
FIG. 2 shows a block diagram of an E unit in accordance with the present invention.

FIG. 2 shows the E unit 2 in accordance with the present invention. The E unit 2 comprises an interruption detection circuit 21, an instruction address control circuit 22 which is a characteristic feature of the present invention, an arithmetic and logical unit (ALU) 23, a branch instruction judgement circuit 24, a stage control circuit 25, a microinstruction decoder 26 and a control storage device 27. The ALU 23 includes a buffer register (not shown) in accordance with the above-referenced patent application.

Taking an ADD instruction (refer to the manual described above) as an example, fetching of the instruction, decoding of the instruction, calculation of an operand address and fetching of an operand are all carried out in the I unit 1, and the addition of the operand and the loading of the result are carried out in the E unit 2. The execution of each instruction is carried out in a plurality of stages as described in the above-referenced patent application, and different stages for different instructions are executed in parallel, that is, the instructions are executed in a pipelined control mode.

In accordance with the present invention, the stages D, A, L, E, P and S are used in the manner described in the above-referenced patent application. Let us consider the process for a basic add instruction in which an operand in the storage device and the content of a general purpose register of the processing unit are added together and the sum thereof is loaded back into the general purpose register. After the I unit 1 has fetched an instruction to be executed next from the S unit 3, the I unit 1 reads the content of a general purpose register specified by the instruction during the D stage in order to determine an operand address in the main storage and the operand address is calculated. In the A stage, the operand address calculated in the D stage is sent to the S unit where a buffer address for accessing a buffer storage (not shown) in the S unit 3 is determined based on the operand address. In the L stage, the operand data is read from the buffer storage in the S unit 3 and it is transfered to the E unit 2. The I unit 1, on the other hand, reads the content of the general purpose register, which is one operand for the instruction, based on the register address specified by the instruction and transfers the content to the E unit 2. Thus, at the end of the L stage, the E unit 2 receives the operand data necessary for the operation specified by the instruction. In the E stage, the E unit 2 which has received the operand data carries out the operation specified by the instruction. For example, in the E stage, the register operand is added to the storage operand to produce the sum thereof. In the P stage, the E unit 2 loads the result of addition operation into a program-specified register such as a general purpose register. In the E stage, the content of the general purpose register to be updated in the E stage is buffered to a buffer register before the result of the operation is loaded. In the above-referenced patent application, the buffering is carried out after the E stage while the present invention carries it out in the E stage. In a system in which an overrun occurs due to the delay of the detection of the interruption, the result of the operation is written in the main storage 4 not in the P stage but in the next sequential S stage. In the P stage, the S unit 3 determines a buffer address for accessing the main storage 4.

Each stage is usually carried out in one machine cycle. The E stage sometimes may be carried out in more than one machine cycle, but in the present embodiment it is assumed that the E stage is carried out in one machine cycle for the sake of simplicity.

Accordingly, in the next sequential machine cycle of the machine cycle in which the E stage for one instruction is carried out, the E stage for the next sequential instruction is carried out and so on so that the E stage for the next new sequential instruction is carried out in each machine cycle.

At the beginning of the E stage for each instruction, the I unit 1 sends an operand necessary for the operation, the next sequential instruction of the current instruction and the instruction length code thereof via lines 123, 100 and 101, respectively.

In the prior art system, the I unit comprises first means for generating the instruction length of a decoded instruction and an address of the next sequential instruction of the decoded instruction (or an address of the instruction in the branch failure stream if the decoded instruction is a branch instruction), during the decoding of the successive instructions, and for holding the address until the E stage for the decoded instruction starts, and second means for generating a branch-to address when a branch address is decoded and for holding the address until the E stage for the branch instruction starts. The prior art I unit further comprises third means responsive to an E stage start signal, at the time of start of the E stage for other than the branch instruction, for sending the instruction length of the instruction for which the E stage is going to start and the address of the next sequential instruction of the last-mentioned instruction from the first stage to the E unit through a first address line, and at the time of start of the E stage for the branch instruction, is responsive to the E stage start signal for sending the instruction length of the branch instruction and the address of the next sequential instruction of the branch instruction (that is, the instruction in the branch failure stream) from the first means through the first address line and for sending the branch-to address from the second means to the E unit through a second address line.

The I unit 1 of the present invention includes the same first means as that of the prior art system and a second means which is modified to hold the branch-to address until the next sequential stage of the E stage for the branch instruction. The third means of the I unit 1 of the present invention is modified such that it does not send the branch-to address to the E unit at the time of start of the E stage for the branch instruction but sends the branch-to address from the second means to the E unit through the first address line in the next sequential stage of the E stage in response to the branch success signal. The first address line is shown by a line 100 in FIG. 2. It should be noted that in the present invention the I unit 1 and the E unit 2 are interconnected through the single address line.

Furthermore, in the I unit of 1 of the present invention, regardless of the modification of the circuits for generating, holding and sending the instruction addresses, a circuit for holding and sending the instruction length code is not modified. The present invention is the same as the prior art I unit in that the instruction length code is also sent from the I unit 1 to the E unit 2 via a single signal line 101. The above modifications can be readily made by those skilled in the art and hence further detail of the I unit 1 is not explained here.

Figure 1:
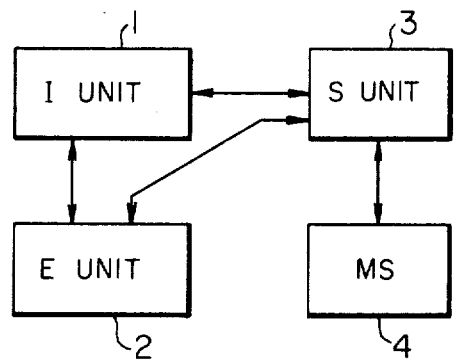
FIG. 1 shows a prior art information processing system to which the present invention is applied.

In the E stage for the ADD instruction, the two operands supplied from the I unit 1 via a line 123 are added together in the ALU 23 and the resulting sum is sent to the I unit 1 via a line 232 and loaded into a general purpose register (not shown) in the I unit 1. The addition operation is controlled by microinstructions. An address of a leading microinstruction of the microprogram which controls the E stage for the ADD instruction is sent from the I unit 1 to the control storage device 27 via a line 271 and the leading microinstruction is sent to the decoder 26 via a line 270. The decoder 26 decodes the microinstruction and initiates the addition operation by the ALU 23 via a line 266. Since the E stage for a basic instruction such as an ADD instruction is completed in one machine cycle, a signal EOP which indicates the end of the E stage for the microinstruction read from the control storage device 27 assumes the level "1". This signal is sent to the stage control circuit 25 via a line 261. The stage control circuit 25 responds to that signal to send a signal indicating the start of the E stage for the next sequential instruction to the instruction address control circuit 22 and the I unit 1 (FIG. 1) via a line 250. It also sends a signal indicating the end of the E stage to the interruption detection circuit 21 via a line 251. The instruction address control circuit 22 responds to the E stage start signal 250 from the stage control circuit 25 to receive and store the instruction address and the instruction length code on lines 100 and 101, respectively. The ALU 23 has a register (not shown) for buffering the content of the register to be updated as the instruction is executed in accordance with the overrun method. For the E stage for the ADD instruction, the content of the general purpose register in the I unit 1 which is to be updated by the ADD instruction is buffered in the buffer register in the ALU 23. It is also controlled by microinstructions. The data to be buffered is sent from the I unit 1 to the ALU 23 via a line 123 and stored in the buffer register by the output of the decoder 26 on a line 266. In the above-referenced patent application, the buffering is carried out in the P stage but in the present invention it is carried out in the E stage because of simplicity of buffering. The ALU 23 checks if the sum in the E stage overflows from the general purpose register (not shown) in the I unit 1 to which the sum is loaded, and if it overflows the ALU 23 sends an overflow signal to the interruption detection circuit 21 via a line 230.

The operations of the respective stages are controlled by clock pulses which assume the level "1" at times $T_0$, $T_1$, $T_2$ and $T_3$ each spaced by one quarter of a machine cycle. In the prior art system which does not adopt the overrun method, the interruption detection circuit 21 detects the signal on the line 230 at time $T_1$ in each stage. In the present invention which uses the overrun method, the interruption detection circuit 21 detects the signal on the line 230 at time $T_3$ in each stage and provides the detection result at time $T_1$ in the next sequential stage. Since the overflow is a completion type interruption request, the interruption detection circuit 21 responds to the reception of the end of E stage signal on the line 251 to produce interruption signals on lines 210 and 212 and produce a signal indicating that the detected interruption is of the completion type on a line 211. The interruption detection circuit 21 checks if the interruption is acceptable and produces the interruption signal.

The interruption detection circuit 21 also has a function to respond to the interruption signal applied from the I unit 1 or an I/O control unit (not shown) through a line 121 to produce the interruption signals on the lines 210, 211 and 212. The stage control circuit 25 responds to the interruption signal on the line 212 to immediately terminate the execution stage for the next sequential instruction and provides an interruption signal to the control storage device 27 through a line 252. In response to this signal, the control storage device 27 forcibly sets the microinstruction address to the address of the leading microinstruction of the microprogram and reads out the interruption processing microprogram. The stage control circuit 25 suspends the execution of the execution stage until the microprogram has been executed. That is, the signal 250 indicating the start of the E stage and the signal 251 indicating the end of the E stage are not produced during this period. When the interruption signal appears on the line 210, the instruction address control circuit 22 stops to fetch the instruction address from the I unit 1 and to update the input pointer signal which specifies the register to be loaded. Then, the interruption processing microprogram is executed. In this microprogram, a microinstruction for reading the instruction address stored in the old PSW is read from the control storage device 27 and a decode signal for the microinstruction is sent to the instruction address control circuit 22 via the line 262 and the instruction address in the old PSW is supplied to the ALU 23 via a line 220. The ALU sends it to a line 232. The instruction address is written in the main storage 4 via the storage control unit 3. In this manner, the instruction address in the old PSW is buffered in the main storage 4. In the overrun method, the content of the general purpose register previously buffered in the ALU in the interruption processing microprogram is sent to the I unit 1 via the readout line 232 to restore the content of the general purpose register. Because the detection of the interruption is delayed by one cycle, the E stage for the next sequential instruction of the ADD instruction is executed. If the next sequential instruction is also an ADD instruction, the general purpose register is updated. Accordingly, the content of the updated general purpose register is initialized in the interruption processing microprogram.

In another example, a branch-on-condition instruction (BC instruction) is explained. In the E stage for the BC instruction, branch success/branch failure is determined. Prior to the start of the E stage for the BC instruction, instruction mask information is sent from the I unit 1 to the ALU 23 via the line 123 and a condition code CC in the ALU 23 and the mask information are sent to the branch instruction judgement circuit 24 via a line 231.

As described above, the I unit 1 calculates and stores, in the D stage for the BC instruction, the address of the instruction to be executed when the branch fails (the address in the branch failure stream) and the instruction length of the BC instruction, and also calculates and stores the address of the instruction to be executed when the branch succeeds (the address in the branch success stream). At the beginning of the E stage for the BC instruction, the instruction address in the branch fail stream and the instruction length of the BC instruction are presented to the lines 100 and 101.

The instruction address control circuit 22 responds to the E stage start signal applied via the line 250 to store the signals on the lines 100 and 101. In the E stage, a microinstruction indicating the branch instruction is read and it is sent to the branch instruction judgement circuit 24 via the line 263. The circuit 24 determines the branch success/branch failure based on the signals applied through the lines 231 and 263 and sends the result of determination to the I unit 1 via the line 241. In the P stage for the BC instruction, the I unit 1 responds to the result of determination on the line 241 to send the instruction address in the branch success stream to the instruction address control circuit 22 via the line 100 if the branch has succeeded. In the P stage for the BC instruction, the branch instruction judgement circuit 24 determines the branch success/branch failure, and if the branch has failed it indicates the branch failure to the instruction address control circuit 22 via the line 240. In response thereto, the circuit 22 receives and stores the instruction address from the line 100.

The operation of FIG. 2 has been explained in connection with two instructions, an ADD instruction and a BC instruction. For the ADD instruction, the instruction address control circuit 22 responds to the E stage start signal 250, and for the BC instruction it responds to the E stage start signal 250 and the branch success signal 240, to receive and store the instruction address from the line 100. However, in some cases, it must respond to signals other than the signals 250 and 240 to receive the signals 100 and 101. As an example, let us consider interruption processing. In the interruption processing program, after the content of the old PSW has been buffered in the main storage 4, a new PSW is fetched from the main storage 4 and sent to the I unit 1. The I unit 1 then sends the instruction address and the instruction length code of the new PSW through the lines 100 and 101. In response thereto, the interruption processing microprogram orders a setting of the instruction address. This order is sent from the control storage device 27 to the CS decoder 26 via the line 270. The CS decoder 26 decodes the order on the line 270 and sends the instruction address setting signal to the instruction address control circuit 22 via the line 260. The circuit 22 responds to this signal to receive and store the instruction address and the instruction length code from the lines 100 and 101. In this case, no signal is produced on the line 250 or 240. Thus, the instruction address setting signal on the line 260 is used to store the instruction address and the instruction code length on the lines 100 and 101 in the instruction address control circuit 22 in response to a specific microinstruction at the beginning of the E stage or when the branch success is detected.

The instruction address control circuit 22 which is a characteristic feature of the present invention is now explained in detail.

Figure 3:
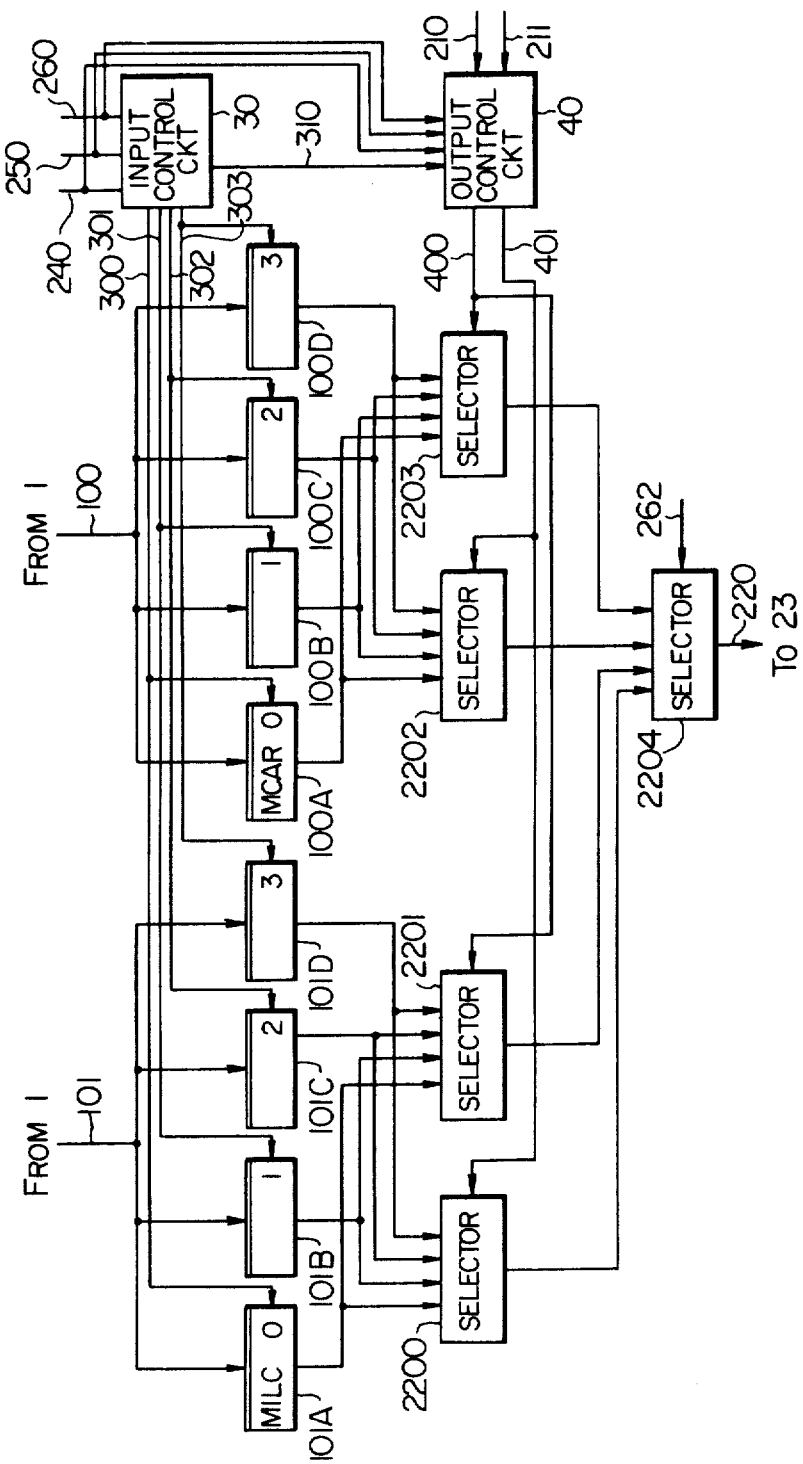
FIG. 3 shows a block diagram of an instruction address control circuit used in the E unit of FIG. 2.

FIG. 3 shows the detail of the instruction address control circuit 22 shown in FIG. 2. In FIG. 3, numerals 101A to 101D denote four registers (MILC) for storing the instruction length codes and numerals 100A to 100D denote four registers (MCAR) for storing the instruction addresses. Numeral 30 denotes a circuit for controlling data inputting to the registers 101A to 101D and 100A to 100D, numeral 40 denotes a circuit for data outputting from the registers 101A to 101D and 100A to 100D, numerals 2200 and 2201 denote selectors responsive to the output of the output control circuit 40 to select the registers 101A to 101D, numerals 2202 and 2203 denote selectors responsive to the output of the circuit 40 to select the registers 100A to 100D, and numeral 2204 denotes a selector responsive to a decode signal of the microinstruction on the line 262 to select the outputs of the selectors 2200 to 2203, numerals 300 to 303 denote signals for selecting one of the four registers and instructing the setting thereof, numerals 400 and 401 denote signals applied to the selectors 2200 to 2203 to select the instruction address for the PER and the instruction length code thereof, and the instruction address for the old PSW and the instruction length code thereof. The instruction length code is stored in one of the registers 101A to 101D from the I unit 1 via the line 101. The instruction address is stored in one of the registers 100A to 100D from the I unit 1 via the line 100.

When a program instruction occurs subsequently, necessary signals are read out from those stacks by the outputs on the lines 400 and 401 of the circuit 40 since the necessary instruction address and the instruction length code are held in those registers. When those signals are to be sent to the ALU 23, one of the selectors 2200 to 2203 is selected by the selector 2204 and the signals are sent to the ALU 23 via the line 220. FIG. 4 shows further detail of the circuit 30 shown in FIG. 3. In FIG. 4, numerals 3000, 3010 and 3020 denote 2-bit registers which are set at times $T_3$, $T_1$ and $T_3$, respectively. Numeral 3030 denotes an add-one adder and numeral 3050 denotes a decoder for decoding the two bits. The output of the register 3010 is applied to the register 3000 via the add-one adder 3030. When one of the branch success signal, the E stage start signal and the instruction address setting signal is applied to an OR gate 60, the register 3000 responds to the output of the OR gate 60 to read in the output of the add-one adder 3030 at the time $T_3$. The circuit is designed such that the branch success signal 240, the E stage start signal 250 and the instruction address setting signal 260 are produced at times $T_1$, $T_0$ and $T_0$, respectively. The register 3010 stores the output of the register 3000 at time $T_1$, one half machine cycle after the setting of the data to the register 3000. Another half machine cycle later, at time $T_3$, the output of the register 3010 is stored in the register 3020 and also stored in the register 3000. Thus, the output of the register 3010 cyclically changes in the sequence of 0, 1, 2, 3, 0, 1, ... in synchronism with the machine cycle. The output of the register 3010 is applied through a decoder 3050 to four AND gates 50 to which the output of the OR gates 60 is also applied so that signal "1" cyclically appears on the lines 300 to 303. The signals on the lines 300 to 303 are used as the input pointer signals to selectively set the registers 100A to 100D and 101A to 101D. The register 3020 holds the one-cycle delayed output of the register 3000 and sends it to the output control circuit 40 via the line 310. Thus, the register 3000 holds the signal for specifying the registers in which the signals on the lines 100 and 101 are to be stored in the next machine cycle, and the register 3020 holds the signal for specifying the registers in which the signals on the lines 100 and 101 are to be stored in the current machine cycle.

For example, when the E stage start signal on the line 250 assumes "1", the register 3000 stores the input pointer signal which specifies the registers in which the signals on the lines 100 and 101 are to be stored in the E stage for the next sequential instruction, and the register 3020 stores the input pointer signal which specifies the registers in which the signals on the lines 100 and 101 are to be stored in the E stage specified by the E stage start signal. The same is true for the branch success signal and the instruction address setting signal of the microinstruction on the lines 240 and 260.

Thus, when the input control circuit 30 receives the E stage start signal from the line 250, the branch success signal from the line 240 or the instruction address setting signal from the line 260, it reads the instruction address on the line 100 and the instruction length code on the line 101 into one of the four instruction address registers 100A to 100D and one of the instruction length code registers 101A to 101D, respectively, depending on the applied input pointer signal. It also sends the input pointer signal to specify the register set at that time, to the output control circuit 40 via the line 310.

FIG. 5 shows further detail of the output control circuit 40 shown in FIG. 3. In FIG. 5, numerals 3100 to 3104 denote 2-bit registers. The register 3100 sets the output of the register 3020 (FIG. 4) on the line 310 at time $T_1$ which is one half machine cycle later than time $T_3$ at which the data is set to the register 3020. The registers 3101 to 3104 set the outputs of their preceeding registers one half machine cycle later than the times at which the data are set to the preceeding registers. The register 3103 provides an output pointer signal for selecting the PER address and the register 3104 provides an output pointer signal for selecting the old PSW, to the lines 400 and 401, respectively. Numerals 2500 to 2503 denote delay latches for shifting the E stage start signal supplied from the line 250 in every one half machine cycle, numerals 2100 to 2103 denote delay latches for shifting the interruption signal supplied from the line 210 in every one half machine cycle, numerals 2110 and 2111 denote delay latches for shifting the completion type interruption signal supplied from the line 211 in every one half machine cycle, numerals 2600 to 2603 denote delay latches for shifting the instruction address setting signal supplied from the line 260 in every one half machine cycle, and numerals 2400 to 2403 denote delay latches for shifting the branch success signal supplied from the line 240 in every one half machine cycle. By delaying and storing the signals on the lines 250, 210, 211, 260 and 240 in this manner and logically operating those signals by AND gate 70, 72 and 73 and an OR gae 82, the setting of the latches 3103 and 3104 is controlled. Detail of the control will be explained later in connection with FIGS. 7, 8 and 9.

In FIG. 5, as will be explained below, the input pointer signal on the line 310 for the instruction address and the instruction length code, set in the E stage, are memorized until the S stage in which the interruption of the instruction is detected, and if the interruption takes place, the signal is held.

In the overrun method of the interruption, the instruction address pointer signals are stored in the registers 3100 to 3104 until the interruption is subsequently detected, and they are sent to the lines 401 and 400 as the output pointer signal for the old PSW and the output pointer signal for the PER address, respectively. Those registers are set in response to the E stage start signal from the line 250. In the present embodiment, since the detection of the interruption is delayed one cycle, the 2-bit registers 3100 to 3104 are provided as the delay registers for the input pointer signal on the line 310. In a system in which the detection of the interruption is not delayed, the delay registers for one cycle may be omitted.

When the completion type interruption takes place, the signals on the line 210 and 211 assume "1" to inhibit the update of the registers 3103 and 3104 so that the input pointer signal for the interrupted instruction is held.

Delay latches are also provided for the signals on the control signal lines 210, 211, 260 and 240. Detailed operation thereof will be explained in connection with FIGS. 7, 8 and 9.

The operation of the instruction address control circuit 22 of the present invention is now explained in further detail.

Suppression Type Interruption—Instruction other than Branch Instruction

Figure 6A:
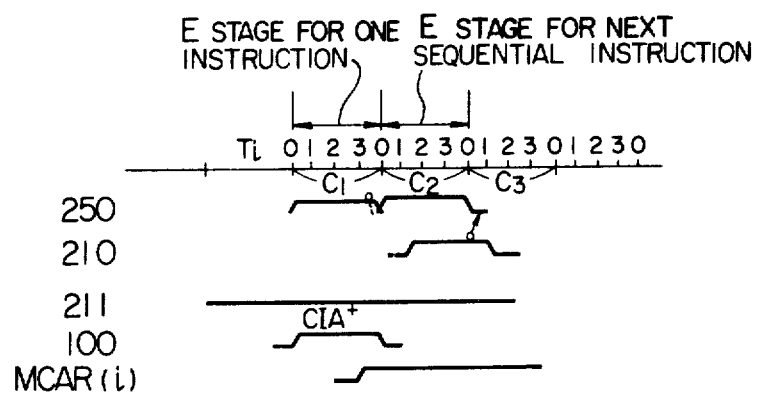
FIGS. 6a and 6b show time charts for signals applied to the instruction address control circuit of FIG. 3 when a suppression type interruption request and a completion type interruption request, respectively, are issued.
Figure 7:
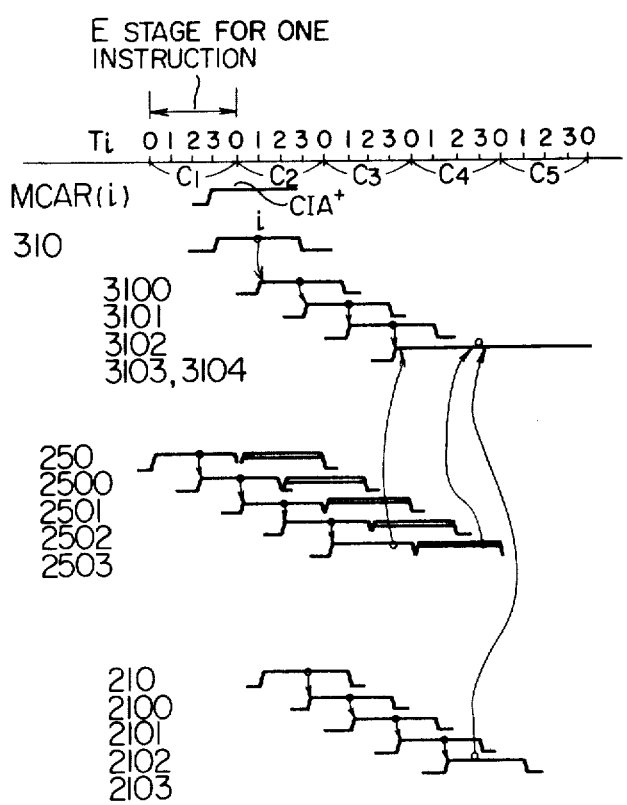
FIG. 7 shows a time chart for signals generated in the instruction address control circuit of FIG. 3 when the suppression type interruption request is issued.

FIG. 6a shows signals applied to the instruction address control circuit 22 when the suppression type interruption request is issued during the execution of an instruction A other than the branch instruction. FIG. 7 shows signals in the instruction address control circuit 22 when the interruption request is issued.

When the suppression type interruption request is issued in the E stage (machine cycle C1) for the instruction A, the interruption is detected in accordance with the present invention one machine cycle later than the machine cycle C1 by the interruption detection circuit 21. That is, the detection circuit 21 generates interruption signals 210 and 212 at time $T_1$ in the P stage (machine cycle C2) for the instruction A. For the suppression type interruption, a completion type interruption signal 211 is not produced. As explained above, after the stage control circuit 25 has received the interruption signal 212, it executes the interruption processing microprogram. As will be explained later, the interruption processing microprogram is executed after desired pointer signals have been set into the latches 3103 and 3104. In the E stage for the instruction A, the buffered content of the general purpose register is restored and the instruction address for the old PSW and the instruction length code are buffered into the main storage 4. For the suppression type interruption, the instruction address for the old PSW is an address of the next sequential instruction B of the interrupted instruction A.

In the machine cycle C1, the E stage for the instruction A is executed. When it is completed, the interruption signal 212 has not yet been produced. Accordingly, when the E stage is completed in the machine cycle C1, the stage control circuit 25 produces the E stage start signal 250 at the beginning of the machine cycle C2 so that the E stage for the next sequential instruction B of the instruction A to which the suppression type interruption has taken place is executed. In the machine cycles in and after the machine cycle C3 after the interruption has been detected, the E stage start signal 250 is not produced. As described above, the I unit 1 sends the address of the next sequential instruction of the instruction for which the E stage is executed and the instruction length code thereof to the address control circuit 22 at the beginning of the E stage.

In the present example, at the beginning of the E stage for the instruction A, that is, at time $T_0$ in the machine cycle C1, the I unit 1 sends the address CIA+ of the next sequential instruction B and the instruction length code CIL+ to the lines 100 and 101, respectively. The delay latch 3010 stores the output of the delay latch 3000 at time $T_1$ in every machine cycle. Let us assume that the delay latch 3010 has stored a value i at time $T_1$ of the E stage for the instruction A (in the machine cycle C1). This value is held until time $T_1$ in the next machine cycle C2. The value i may assume any one of 0, 1, 2, 3. The value i in the delay latch 3010 is decoded by the decoder 3050, which opens one of the four AND gates 50 connected thereto. The AND gates 50 receive the E stage start signal 250, the branch success signal 240 and the instruction address setting signal 260 through the OR gate 60. The E stage start signal 250 in the machine cycle C1 is supplied to one of the lines 300 to 303 through the selected one of the AND gates 50. As a result, data is set into one of the registers MCAR 100A to 100D and one of the registers MILC 101A to 101D connected to the lines 300 to 303.

Setting of data to those registers is carried out at time $T_3$ in every E stage. In the present example, since the value i has been set to the delay latch 3010 at time $T_3$ in the E stage (machine cycle C1), the instruction address CIA+ and the instruction length code CIL+ sent to the lines 100 and 101 in the machine cycle C1 are stored in the i-th MCAR and MILC, respectively. The value i in the delay latch 3010 is set to the delay latch 3020 at time $T_3$ in the same E stage and is applied to the delay latch 3100 via the line 310. The value i is sequentially loaded into the delay latches 3100 and 3101 with the delay of one half machine cycle, respectively, and the content of the latch 3101 is loaded into the delay latches 3103 and 3104 with the delay of another half machine cycle. The time at which the value i is loaded into the latch 3103 is time $T_3$ two machine cycles later than the E state for the instruction A. The latch 3103 is used to read out the PER address while the latch 3104 is used to read out the instruction address for the old PSW. Since the interruption due to the PER is the completion type interruption, loading into the latch 3103 will be explained later in connection with the completion type interruption. Loading into the latch 3104 only is explained here. The latch 3104 is set by the output of the OR gate 82 to which the outputs of the AND gates 72 and 74 are applied.

As will be apparent, the E stage start signal 250 and the interruption signal 210 are to be discussed with respect to the suppression type interruption request issued during the execution of normal instruction.

As explained above, the E stage start signal 250 appears for two machine cycles starting from time $T_0$ of the E stage for the instruction A (machine cycle C1). The signal 250 is set into the four delay latches 2500 to 2503 sequentially with the delay of one half machine cycle. Thus, the delay latch 2503 produces a "1" output from time $T_0$ in machine cycle C3 which is two machine cycles later than the E stage for the instruction A, to time $T_0$ in the next sequential machine cycle C4. On the other hand, the interruption signal 210 appears for one machine cycle starting from time $T_1$ in the next sequential machine cycle C2 of the E stage for the instruction A and it is set to the four delay latches 2100 to 2103 sequentially with the delay of one half machine cycle. Thus, the latch 2103 produces a "1" output from time $T_1$ in machine cycle C4 to time $T_1$ in the next sequential machine cycle C5, and produces a "0" output in other period. Accordingly, at time $T_3$ in machine cycle C3 at which the value i is to be loaded to the latch 3104, the output "1" of the latch 2503 and the inverted output "1" of the latch 2103 are applied to the AND gate 72, the other input to which is also "1". Accordingly, the AND gate 72 produces a "1" output which causes the value i to be loaded into the latch 3104. At time $T_3$ in machine cycle C4 at which next value is to be loaded into the latch 3104, the stored value of the latch 2103 is "1" and an inverted output thereof causes the AND gate 72 to produce "0" output. As a result, a new value is not loaded into the latch 3104 and the previous value is held. The content of the latch 2103 is not updated thereafter. The latch 3103 is loaded with the same value. Accordingly, during the execution of the interruption processing microprograms, the selectors 2202 and 2200 read the instruction address CIA+ and the instruction length code CIL+, respectively, from the MCAR and the MILC registers specified by the latch 3104 and send them to the selector 2204. When the microinstruction for reading an instruction address to be stored in the old PSW is executed in the microprogram, the selector 2204 responds to a decode signal 262 of that microinstruction to select the outputs of the selectors 2202 and 2200 to send the instruction address CIA+ and the instruction length code CIL+ to the ALU 23 via the line 220.

Completion Type Interruption—Instruction other than Branch Instruction

Figure 6B:
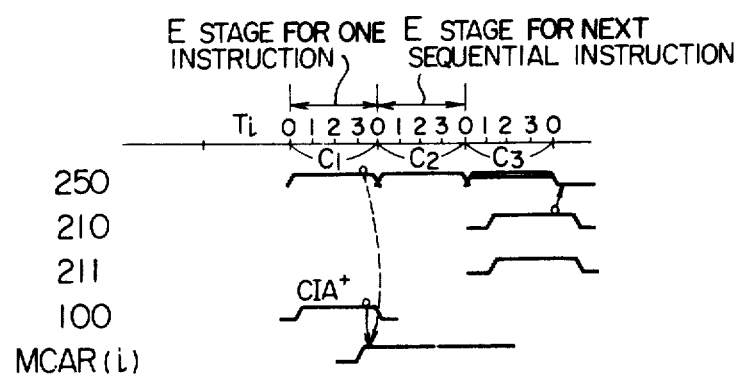
Figure 8:
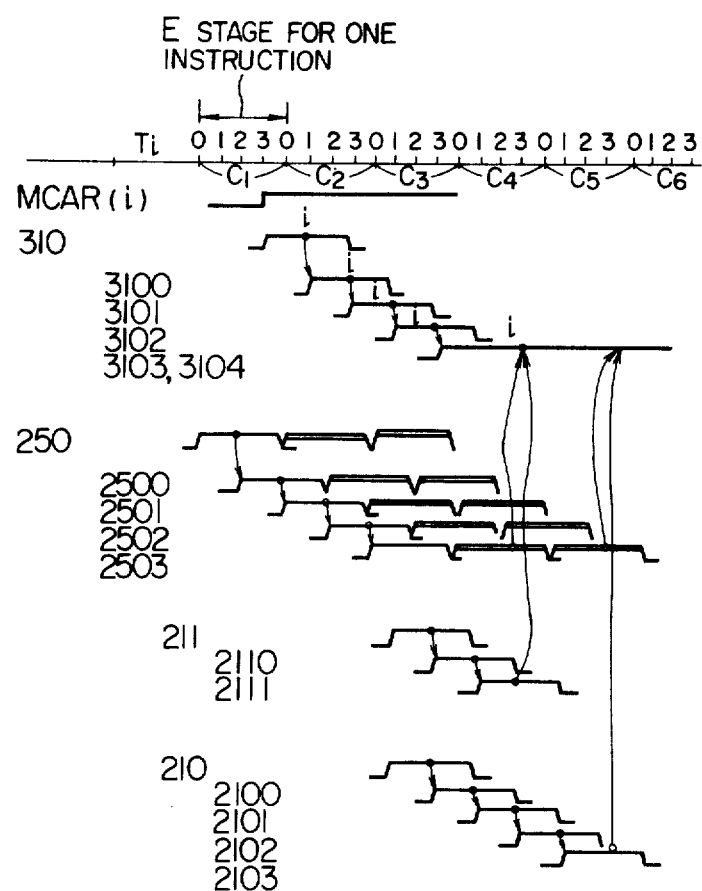
FIG. 8 shows a time chart for signals generated in the instruction address control circuit of FIG. 3 when the completion type interruption request is issued during the execution of an instruction other than a branch instruction.

FIG. 6b shows signals applied to the instruction address control circuit 22 when a completion type interruption request is issued during the execution of an instruction A other than the branch instruction. FIG. 8 shows signals in the instruction address control circuit 22 when the interruption request is issued. Like in the case of the suppression type interruption, it is assumed that a value i is loaded into the latch 3010 at time $T_1$ of the E stage for the instruction A (machine cycle C1). The instruction address CIA+ and the instruction length code CIL+ of the next sequential instruction B of the instruction A are loaded into the i-th MCAR 100A-100D and the i-th MILC 101A-101D at time $T_3$ in machine cycle C1.

The completion type interruption differs from the suppression type interruption in the following points: (1) The interruption signal 210 is produced at time $T_1$ in machine cycle C3 which is two machine cycles later than the E stage for the instruction A. (2) A completion type interruption 211 is also produced simultaneously. (3) Because the interruption signal 210 is produced later in the completion type interruption than in the suppression type interruption, the E stage start signal is produced not only in the E stage for the instruction A (machine cycle C1) and in the next machine cycle C2 but also in the next sequential machine cycle C3.

As a result, the latch 2503 produces a "1" output until the end of the machine cycle C5 which is four machine cycles later than the machine cycle C1. On the other hand, the latch 2013 produces a "1" output from time $T_1$ in the machine cycle C5 to time $T_1$ in the next sequential machine cycle C6. The completion type interruption signal 211 is set to the delay latches 2110 and 2111 with the delay of one half machine cycle. Accordingly, the latch 2111 produces an output from time $T_1$ in the machine cycle C4 to time $T_1$ in the next sequential machine cycle C5.

The time at which the value i is to be loaded into the latches 3103 and 3104 is time $T_3$ in the machine cycle C3. At this time point, since the output of the latch 2503 is "1" and the inverted outputs of the latches 2103 and 2111 are both "1", the AND gate 72 produces an output to allow the loading into the latch 3104. Similarly, the AND gate 70 produces an output to allow the loading into the latch 3103. Thus, the value i is loaded into the latches 3103 and 3104 at time $T_3$ in the machine cycle C3. At time $T_3$ in the next sequential machine cycle C4 at which a new value is to be loaded into those latches, the inverted output of the latch 2111 is "0" and hence the AND gates 70 and 72 produce output signals to inhibit the loading of the new value into the latches 3103 and 3104 so that the values i in those latches are held. The completion type interruption signal 211 is produced with the delay of only one machine cycle in order to inhibit the update of the latches 3103 and 3104 at this time. At time $T_3$ in the machine cycle C5, the inverted output of the latch 2103 is "0" and hence the values i in the latches 3103 and 3104 are again not updated. The latches hold the value i thereafter. Like in the case of the suppression type interruption, the value i of the latch 3104 is used to read the instruction address for the old PSW and the instruction length code thereof in the interruption processing program. If the completion type interruption is due to the PER, the PER address and the instruction length code thereof can be read from the i-th MCAR and MILC by the decode signal 262 and the selectors 2203, 2201 and 2204 when a microprogram for reading the PER address and the instruction length code is executed in the interruption processing program.

Completion Type Interruption—Branch Instruction

Figure 9:
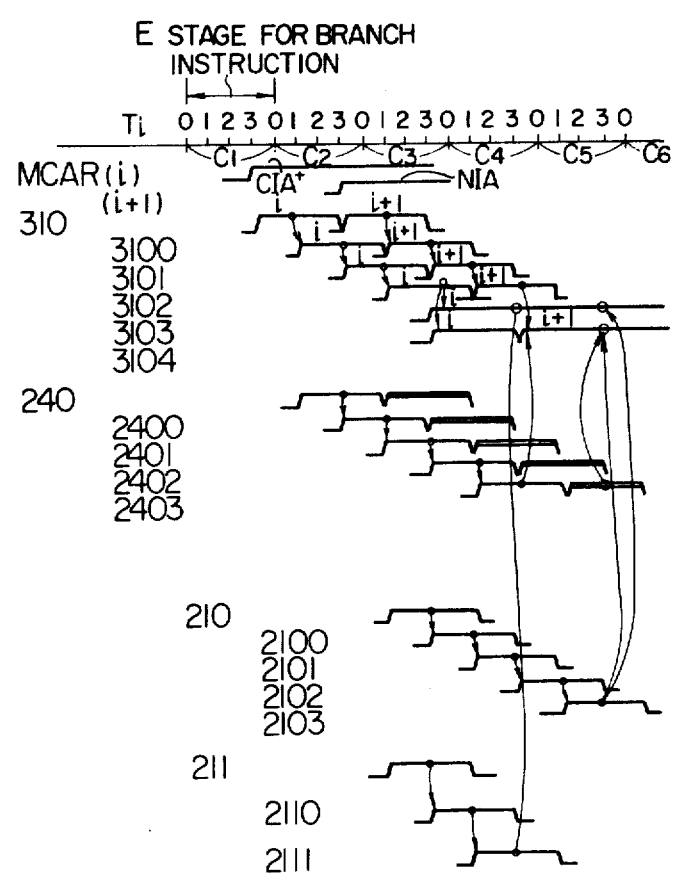
FIG. 9 shows a time chart for signals generated in the instruction address control circuit of FIG. 3 when the completion type interruption request is issued during the execution of a branch instruction.

Referring to the time chart of FIG. 9, the operation of the embodiment of the present invention when a completion type interruption request is issued during the execution of a branch instruction and the branch eventually succeeds. Since the E stage start signal 250 is produced in the same manner as in FIG. 8, the signal 250 is not shown in FIG. 9 for the sake of simplicity. As described above, the instruction address for the old PSW and the instruction address for the PER must be an address in the branch success stream and an address of the branch instrution, respectively. Like in the case of normal instruction, the address CIA+ of the next sequential instruction B of the branch instruction (that is, the instruction in the branch failure stream) and the instruction length CIL+ of the branch instruction are loaded to the i-th MCAR and MILC at time $T_3$ in the E stage for the branch instruction (machine cycle C1). In the E stage, the branch instruction judgement circuit 24 determines if the branch has succeeded or failed. If it determines that there has been a branch success, a branch success signal is supplied to the I unit 1 via the line 241 at time $T_1$ in the E stage. In the next sequential P stage (machine cycle C2), the I unit 1 sends the address of the instruction in the branch success stream, instead of the next sequential instruction of the instruction B, to the instruction address control circuit 22 via the line 100. Thus, the address of the instruction in the branch success stream is loaded into the (i+1)th MCAR. At this time, the data from the line 101 is set into the MILC, but this operation is not concerned with the present invention. When the completion type interruption is detected in the P stage for the branch instruction (machine cycle C2), the interruption signal 210 and the completion type interruption signal 211 are produced at time $T_1$ in the next sequential S stage (machine cycle C3).

Like in the case of FIG. 8, the pointer value i loaded to the latch 3010 at time $T_1$ in the machine cycle C0 is delayed two machine cycles through the latches 3020, 3100, 3101 and 3102. The latch 3102 holds the value i for one machine cycle starting from time $T_1$ in the machine cycle C4. Similarly, the value (i+1) loaded into the latch 3010 at time $T_1$ in the machine cycle C2 is held in the latch 3102 for one machine cycle starting from time $T_1$ in the machine cycle C4. The AND gate 70 and the OR gate 82 control the loading of the pointer value into the latches 3103 and 3104 in the following manner. When the interruption request is issued during the execution of the branch instruction and if the branch succeeds, the branch success signal 240 is produced at time $T_1$ in the machine cycle C2 and it is produced from the latch 2403 with the delay of two machine cycles through the delay latches 2400 to 2403. However, the output of the latch 2403 is not supplied to the AND gate 70 which controls the loading to the latch 3103. Accordingly, the output value i of the latch 3102 is loaded into the latch 3103 at time $T_3$ in the machine cycle C3 as is the case of FIG. 8 and the value in the latch 3103 is not updated thereafter.

On the other hand, at time $T_3$ in the machine cycle C3 at which the value i is into be loaded to the latch 3104, the output of the latch 2403 is "0" and hence the value i in the latch 3102 is loaded into the latch 3104 like in the case of FIG. 8 where the branch success signal 240 is absent. At time $T_3$ in the next sequential machine cycle C4, the output of the latch 2403 is "1" and the inverted output of the latch 2103 is also "1". As a result, the AND gate 74 supplies a signal to allow the update of the stored value in the latch 3104 through the OR gate 82. Accordingly, the latch 3104 is loaded with the value (i+1) provided from the latch 3102. At time $T_3$ in the next sequential machine cycle C5 and the following machine cycles, the output of the latch 2403 is normally "0" and hence the latch 3104 is not updated as is the case of FIG. 8. In this manner, the pointer value i for the branch instruction and the pointer value (i+1) of the instruction in the branch success stream are stored in the latches 3103 and 3104, respectively, and they are used to read the PER address and the instruction length code thereof, and the instruction address for the old PSW and the instruction length code thereof, respectively.

In FIG. 9, the branch success signal 240 appears in two machine cycles. The second branch success signal 240 is produced at time $T_1$ in the machine cycle C3 as described above and it is produced from the latch 2403 with the delay of two machine cycles through the delay latches 2400 to 2403. Accordingly, at time $T_3$ in the machine cycle C5, the output of the latch 2403 is "1" while the inverted output of the latch 2103 is "0". As a result, the AND gate 74 produces a signal to inhibit the loading of new data into the latch 3104 so that the latch 3104 holds the value (i+1) which was loaded at time $T_3$ in the machine cycle C4. At time $T_3$ in and after the machine cycle C6, the output of the latch 2403 is "0" and hence the latch 3104 is not updated as in the case of FIG. 8. Since the output of the latch 2403 is not applied to the AND gate 70 which controls the loading into the latch 3103, the value of the latch 3103 is not updated in and after the machine cycle C4 as in the case of FIG. 8.

As is apparent from the above description, when the completion type interruption request is issued during the execution of the branch instruction and if the branch fails, the branch success signal 240 is not produced and the latches 3103 and 3104 are loaded with the pointer value i for the branch instruction and hold them. When the suppression type interruption request is issued during the execution of the branched instruction and if the branch succeeds, the latches 3103 and 3104 are loaded with the values i and (i+1), respectively, and if the branch fails the latches 3103 and 3104 are both loaded with the value i. This will be more fully understood by refering to FIGS. 4 to 7 and 9 and the explanation therefor, and hence no further explanation is given here.

Another example in which a new PSW read in the interruption processing microprogram includes an exception for specification which causes a program interruption.

In this case, the instruction address for the old PSW must be the instruction address for the new PSW. As explained above, in the interruption processing program, the new PSW is read from the main storage 4 after the old PSW has been buffered in the main storage 4 and the new PSW is sent to the I unit 1. The I unit 1 sends the instruction address and the instruction length code for the new PSW to the lines 100 and 101. Let us assume that the above step is carried out in machine cycle C1. In response thereto, the interruption processing microprogram issues an instruction address setting instruction, which is sent from the control storage device 27 to the CS decoder 26 via the line 270. The CS decoder 26 decodes the instruction on the line 270 and sends the instruction address setting signal to the instruction address control circuit 22 via the line 260 at time $T_0$ in the machine cycle C1. In the circuit 22, at time $T_0$ in the machine cycle C1, the OR gate 60 shown in FIG. 4 opens so that the signal is sent to one of the lines 300 to 303 through the AND gate 50. As a result, the data is loaded into the i-th MCAR and MILC connected to the selected line 300 to 303 at time $T_3$ in the machine cycle C1. That is, the instruction address and the instruction length code for the new PSW are loaded into the i-th MCAR and MILC. Like in the case of FIG. 8, the pointer value i loaded into the latch 3010 at time $T_1$ in the same machine cycle C1 is delayed two machine cycles through the latches 3020, 3100, 3101 and 3102. The latch 3102 thus holds the value i for one machine cycle starting from time $T_1$ in the machine cycle C3. On the other hand, the signal 260 produced at time $T_0$ in the machine cycle C2 is loaded into the latches 2600, 2601, 2602 and 2603 at time $T_2$ in the machine cycle C2, at time $T_0$ in the machine cycle C3, at time $T_2$ in the machine cycle C3 and at time $T_0$ in the machine cycle C3, respectively. The interruption signal 210 is produced at time $T_1$ in the machine cycle C2 like in the case of the suppression type interruption, and the completion type interruption signal 211 is not produced. The interruption signal 210 is also delayed two machine cycles through the latches 2100, 2101, 2102 and 2103. The latch 2103 thus holds the interruption signal 210 for one machine cycle starting from time $T_1$ in the machine cycle C4.

As a result, at time $T_3$ in the machine cycle C3, the output of the latch 2603 is "1" which causes to open the OR gate 80, and the outputs of the latches 2503 and 2103 are "0", which cause the AND gate 72 to open. Accordingly, the value i in the latch 3102 is loaded to the latch 3104 through the OR gate 82. In and after the next sequential machine cycle C4, the output of the latch 2603 is "0" and the outputs of the latches 2503 and 2403 are also "0". Accordingly, the latch 3104 is not updated. In this manner, the pointer value i for pointing to the instruction address for the new PSW is stored in the latch 3104 and it is used to read out the instruction address for the old PSW from the MCAR. In this case, the instruction length code is not needed.

In the illustrated embodiment of the present invention, it is assumed that the detection of the interruption is delayed one cycle. However, the present invention is equally applicable to a case where the detection is delayed two or more cycles.

As explained above, the number of the update signals 250 for the instruction address, including that produced in the E stage for the instruction is three at maximum. Therefore, three MCAR's and three MILC's are sufficient for the intended operation. However, taking the use of the instruction address for retry of the instruction and the expandability of the system into consideration, four MCAR's are used in the embodiment of the present invention. In this manner, the number of signal lines between the I unit 1 and the E unit 2 is reduced and the maximum of three MCAR's and MILC's, respectively, are sufficient to generate the instruction address for the old PSW and the instruction address for the PER.

In addition to the illustrated embodiment, the present invention includes modifications which can be made by those skilled in the art within the scope of the claims. For example, when the signals 210, 211, 240 and 260 are applied to the output control circuit 40 later than the timings shown in FIGS. 6 to 9, portions of the latches 2100 to 2103, 2110, 2111, 2600 to 2603 and 2400 and 2403 shown in FIG. 5 which delay those signals are omitted and the output control circuit 40 is modified such that setting signals are applied to the latches 3103 and 3104 at times when the pointer values for the instruction address for the PER and the instruction address for the old PSW are applied to the latches 3103 and 3104, respectively.

What is claimed is:

1. An information processing system comprising:
   instruction means for sequentially decoding a plurality of instructions to generate the address of the next sequential instruction and to additionally generate, when the decoded instruction is a branch instruction, a branch-to address of said decoded branch instruction;
   means for generating an interrupt signal for various types of interrupt requests at a timing depending on the type of interrupt request;
   execution means connected to said instruction means for sequentially executing operations of said decoded instructions, when no interrupt signal is recieved from said interrupt generating means, including means for providing a first signal to said instruction means in response to completion of the operation of each of said decoded instructions for fetching from said instruction means a next sequential instruction address for an instruction to be next executed and means for providing a second signal to said instruction means, when a branch instruction is executed and the branch is successful, to fetch a branch-to address of said branch instruction from said instruction means;
   a plurality of registers;
   input pointer means for generating a pointer signal whose value indicates one of said registers, including means for storing any of said next sequential instruction address and said branch-to address, as fetched, in the register indicated by said pointer signal, and means for sequentially and cyclically changing said pointer value in response to one of said first and second signals for indicating said registers sequentially and cyclically;
   delay means connected to said input pointer means for receiving the pointer signal and producing it at a predetermined time delay;
   control means connected to receive said first, second and interrupt signals and for producing a third signal at a timing which is determined by said first, second and interrupt signals;
   latch means for latching said delayed pointer signal in response to said third signal; and
   means for reading the address out of one of said registers indicated by the delay pointer signal latched by said latch means.

2. An information processing system according to claim 1, wherein said control means comprises second delay means for receiving said first, second and interrupt signals and for reproducing them at predetermined time delays, respectively, and means for producing said third signal when said delayed first, second and interrupt signals satisfy a predetermined logical condition.

3. An information processing system according to claim 2, wherein said interrupt request detecting means produces, as said interrupt signal, a first interrupt signal which is invariable regardless of the type of the detected interrupt request and a second interrupt signal which is variable depending on the type of the detected interrupt request, and said second delay means includes means for receiving said first and second interrupt signals and for reproducing them at different time delays.

4. An information processing system according to claim 2, wherein said control means includes means for producing a fourth signal at a timing which is determined by said first and interrupt signals, said latch means being further responsive to said fourth signal to latch said delayed pointer signal, and wherein the values of said delayed pointer signal latched in response to said third and fourth signal, respectively, indicate the registers which store instruction addresses used for a program status word and a program event record, respectively.

5. An information processing system according to claim 4, wherein said control means further comprises second delay means for receiving said first, second and interrupt signals and for reproducing them at predetermined time delays respectively; means for producing said third signal when said delayed first, second and interrupt signals satisfy a predetermined first logical condition and means for producing said fourth signal when said delayed first and interrupt signals satisfy a predetermined second logical condition.

6. An information producing system according to claim 5, wherein said interrupt request detecting means includes means for producing, as said interrupt signal, a first interrupt signal which is invariable regardless of the type of the detected interrupt request and a second interrupt signal which is variable depending on the type of the detected interrupt request, and said second delay means includes means for receiving said first and second interrupt signals and for reproducing them at different time delays.

* * * * *